US008747975B2

(12) United States Patent
Nakamura et al.

(10) Patent No.: US 8,747,975 B2
(45) Date of Patent: Jun. 10, 2014

(54) SEAMLESS CAN AND METHOD FOR PRINTING ON SEAMLESS CAN

(75) Inventors: Shigeo Nakamura, Yokohama (JP); Makoto Nakasato, Tokyo (JP)

(73) Assignee: Toyo Seikan Kaisha, Ltd., Tokyo (JP)

( * ) Notice: Subject to any disclaimer, the term of this patent is extended or adjusted under 35 U.S.C. 154(b) by 452 days.

(21) Appl. No.: 13/062,059

(22) PCT Filed: Aug. 31, 2009

(86) PCT No.: PCT/JP2009/004258

§ 371 (c)(1),
(2), (4) Date: Mar. 3, 2011

(87) PCT Pub. No.: WO2010/026728

PCT Pub. Date: Mar. 11, 2010

(65) Prior Publication Data

US 2011/0162542 A1 Jul. 7, 2011

(30) Foreign Application Priority Data

Sep. 4, 2008 (JP) ................................ 2008-227241

(51) Int. Cl.
*B32B 1/02* (2006.01)
*B65D 1/40* (2006.01)

(52) U.S. Cl.
USPC ...................................... 428/35.8; 220/62.14

(58) Field of Classification Search
USPC ........... 428/35.7, 35.8, 35.9, 36.4, 36.6, 36.7, 428/36.9, 36.91, 36.92; 220/62.11–62.15, 220/62.22
See application file for complete search history.

(56) References Cited

U.S. PATENT DOCUMENTS

| | | | |
|---|---|---|---|
| 3,817,209 | A | 6/1974 | Zurick |
| 4,328,268 | A | 5/1982 | Tsuji et al. |

FOREIGN PATENT DOCUMENTS

| | | | |
|---|---|---|---|
| JP | 49-111705 | A | 10/1974 |
| JP | 53-123214 | A | 10/1978 |
| JP | 54-143302 | A | 11/1979 |
| JP | 55-6516 | B2 | 2/1980 |
| JP | 11-079174 | A | 3/1999 |
| JP | 2002-103775 | A | 4/2002 |
| JP | 2006-206075 | A | 8/2006 |
| JP | 2006-224585 | A | 8/2006 |

OTHER PUBLICATIONS

International Preliminary Report on Patentability (IPRP) dated Mar. 17, 2011 (and English translation thereof, mailed Apr. 21, 2011) in parent International Application No. PCT/JP2009/004258.
International Search Report dated Nov. 17, 2009 issued in International Appln. No. PCT/JP2009/004258.
Japanese Office Action dated Jan. 22, 2014 (and English translation thereof) issued in counterpart Japanese Application No. 2013-14154 (related to JP 2008-227241, from which the present application claims foreign priority).

*Primary Examiner* — Walter B Aughenbaugh
(74) *Attorney, Agent, or Firm* — Holtz Holtz Goodman & Chick PC

(57) ABSTRACT

A seamless can in which an ink layer is transferred onto a can body thereof by a curved surface printing is provided. The ink layer which has been transferred has an overlapping portion which is formed by mutually overlapping a front-end portion of the ink layer and a rear-end portion of the ink layer in a circumferential direction of the can body. An ink area ratio for at least one of the front-end portion and the rear-end portion is smaller than an ink area ratio of an intermediate portion of the ink layer which is adjacent to and continuous with the overlapping portion and excludes the overlapping portion.

9 Claims, 8 Drawing Sheets

*FIG. 7*

| | PRINTING PLATE | | | OVERLAPPING PORTION | EVALUATION | | |
|---|---|---|---|---|---|---|---|
| | TYPE | PRINTING-START PORTION | PRINTING-END PORTION | INK LEVEL DIFFERENCE μm | PENCIL HARDNESS | NECK-WRINKLING OCCURRENCE RATE (%) | OVERALL EVALUATION |
| EXAMPLE 1 | RESIN RELIEF PLATE | HALFTONE DOT GRADATION | HALFTONE DOT GRADATION | 1.1 | ○(H) | ○(0) | ○ |
| EXAMPLE 2 | RESIN RELIEF PLATE | SOLID | HALFTONE DOT GRADATION | 1.3 | △(F) | △(10) | △ |
| EXAMPLE 3 | RESIN RELIEF PLATE | HALFTONE DOT GRADATION | SOLID | 1.3 | △(F) | △(14) | △ |
| EXAMPLE 4 | WATERLESS OFFSET PLATE | HALFTONE DOT GRADATION | HALFTONE DOT GRADATION | 1.2 | ○(H) | ○(4) | ○ |
| EXAMPLE 5 | WATERLESS OFFSET PLATE | SOLID | HALFTONE DOT GRADATION | 1.4 | △(F) | △(28) | △ |
| EXAMPLE FOR COMPARISON 1 | RESIN RELIEF PLATE | SOLID | SOLID | 3.0 | ×(B) | ×(90) | × |
| EXAMPLE FOR COMPARISON 2 | WATERLESS OFFSET PLATE | SOLID | SOLID | 3.0 | ×(B) | ×(100) | × |

SEAMLESS CAN AND METHOD FOR PRINTING ON SEAMLESS CAN

This application is a U.S. National Phase Application under 35 USC 371 of International Application PCT/JP2009/004258 filed Aug. 31, 2008.

CROSS-REFERENCE TO RELATED APPLICATION

The present application is based upon and claims the benefit of priority from the prior Japanese Patent Application No. 2008-227241 filed on Sep. 4, 2008, the entire contents of which are incorporated herein by reference.

TECHNICAL FIELD

The present invention relates to seamless can, a printing plate for carrying out curved surface printing on a can body, a printing machine for carrying out curved surface printing on the can body of the seamless can, a method for printing on seamless can, and a method for manufacturing seamless can.

BACKGROUND ART

In a process of manufacturing a seamless can, printing is carried out on a can body after forming a can main body in which, the can body and bottom are integrated. In a curved surface printing machine which is used for printing on the seamless can, the can main body which is subjected to printing is externally fitted on a substantially circular cylindrical mandrel, and the printing is carried out in a state of being supported by a cantilever. The printing on the can body is to be carried out by relief printing or waterless offset printing.

In a case of carrying out curved surface printing on the can body by offset printing for instance, ink which has been held on a blanket is transferred onto the can body by moving the blanket by rotating a blanket wheel around a central axis thereof, while pressing an outer peripheral surface of the can body against an upper surface of the blanket. Consequently, the ink is printed in a circumferential direction of the circular cylindrical shaped can body.

For printing on the can body, the ink is to be transferred onto a can body 260 such that an overlapping portion 240 is formed as shown in FIG. 8. Here, FIG. 8 is a cross-sectional view in a direction of thickness, showing ink layers in the overlapping portion 240 on the conventional can body 260, and in a periphery of the overlapping portion 240.

The overlapping portion 240 is formed by transferring the ink onto the can body 260 by overlapping of ink layers corresponding to a front-end portion 210 in a circumferential direction of a printing direction, and a rear-end portion 230 in the circumferential direction respectively, or in other words, a printing-start portion and a printing-end portion of a printing plate, out of an ink layer 200 which has been transferred onto the can body 260.

A varnish 250 is applied by a varnish applicator on the ink layer 200 which has been transferred, and thereafter, the ink layer 200 with the varnish 250 applied thereon is dried by heating in an oven.

After the varnish 250 and the ink in the ink layer 200 are dried, the can main body is subjected to a neck-in processing, and upon being subjected to a flanging processing, the can becomes a seamless can.

As a method for the neck-in processing, currently, a die-neck processing in which a die is used, or a roll-neck processing in which a roll is used, is available.

A neck portion is formed to have a single-stage or a multi-stage shape, or a smooth shape. After the seamless can is filled with a content, a lid which is manufactured separately is double-seamed, and a sterilization process at a high temperature is carried out in a pasteurizer or a retort apparatus, depending on the content.

Patent Literature 1: Japanese Patent Application Laid-open Publication No. 2002-103775

DISCLOSURE OF THE INVENTION

Problems to be Solved by the Invention

However, in the conventional seamless can shown in FIG. 8, a layer thickness of the overlapping portion 240 in the ink layer 200 is about 1.5 times to twice the layer thickness of ink layers 215 and 235 in a portion excluding the overlapping portion, and a level difference with the overlapping portion 240 has been developed.

When the neck-in processing is carried out on the can main body having such an ink-layer formation, since wrinkles are developed from the level-difference as an origin, there is a possibility of degradation of aesthetic appearance of the seamless can.

Moreover, since the ink layer 200 is thicker in the overlapping portion 240, there is a possibility of a color tone in particular, becoming dark, thereby degrading the aesthetic appearance.

Even when the ink layers of the overlapping portion 240 become thick after the varnish 250 is applied on the ink layer 200, there is a degradation of a coated-film strength, and it becomes susceptible to scratches.

The present invention has been made in view of the abovementioned circumstances, and an object of the present invention is to reduce a level difference between an ink layer in the overlapping portion and an ink layer in a portion in continuity with the overlapping portion, and accordingly, to suppress occurrence of wrinkling caused due to a neck-in processing, and prevent degradation of a coated-film strength in the overlapping portion, and improve an aesthetic appearance of the overlapping portion.

Means for Solving the Problems

To solve the abovementioned issues, according to the present invention, there is provided a seamless can in which an ink layer is transferred onto a can body thereof by a curved surface printing, and the ink layer which has been transferred thereon includes an overlapping portion which is formed by mutual overlapping of an ink layer at a front-end portion and an ink layer at a rear-end portion in a circumferential direction of the can body, and an ink area ratio for at least one of the ink layer at the front-end portion and the ink layer at the rear-end portion is smaller than an ink area ratio for an ink layer in a portion in continuity with the overlapping portion, excluding the overlapping portion.

In the seamless can according to the present invention, it is preferable that the ink area ratio for the ink layer at the front-end portion as well as the ink layer at the rear-end portion is smaller than the ink area ratio for at least the ink layer in a portion in continuity with the overlapping portion, excluding the overlapping portion.

In the seamless can according to the present invention, it is preferable that the ink area ratio of the ink layer at the front-end portion decreases gradually toward a front end in the circumferential direction, and the ink area ratio of the ink layer at the rear-end portion increases gradually as going away from the rear end in the circumferential direction.

In the seamless can according to the present invention, it is preferable that the ink area ratio of the ink layer at the front-end portion decreases gradually toward the front end in the circumferential direction to correspond to an increased gradient at which, the ink area ratio of the ink layer at the rear-end portion increases gradually as going away from the rear end in the circumferential direction.

In the seamless can according to the present invention, it is preferable that an average value of the layer thickness in the circumferential direction of the overlapping portion is substantially same as the layer thickness of the ink layer in the portion in continuity with the overlapping portion, excluding the overlapping portion.

In the seamless can according to the present invention, it is preferable that the ink area ratio of the ink layer at the front-end portion and the ink layer at the rear-end portion are controlled by changing an ink area ratio of halftone dots.

In the seamless can according to the present invention, it is preferable that the ink area ratio of the halftone dots is controlled by changing an area of a plurality of halftone dots which are arranged according to a fixed rule.

In the seamless can according to the present invention, it is more preferable that an area of the plurality of halftone dots at the front-end portion decreases gradually toward the front end, and an area of the plurality of halftone dots at the rear-end portion decreases gradually toward the rear end.

In the seamless can according to the present invention, it is preferable that the ink area ratio of the halftone dots is controlled by changing a density of arrangement of the plurality of halftone dots which are arranged irregularly.

In the seamless can according to the present invention, it is preferable that the density of arrangement of the plurality of halftone dots at the front-end portion decreases gradually toward the front end, and the density of arrangement of the plurality of halftone dots at the rear-end portion decreases gradually toward the rear end.

In the seamless can according to the present invention, it is preferable that a length of the overlapping portion in the circumferential direction is more than 0 mm and less than or equal to 3 mm.

A printing plate according the present invention is used for transferring an ink layer onto a can body of one of the abovementioned seamless cans.

It is preferable that the printing plate according to present invention is a relief plate or a waterless offset plate.

A curved surface printing machine for seamless can according to present invention which carries out a curved surface printing on a can body of a seamless can, by using the printing plate of one of the abovementioned printing plate.

A method for printing on a seamless can according to the present invention, in which, a curved surface printing is carried out on a can body of a seamless can, by using the abovementioned printing plate.

A method for manufacturing seamless can according to the present invention includes a step of forming a seamless can, and a printing step of carrying out a curved surface printing on a can body of a seamless can by using the abovementioned printing plate.

A method for printing on seamless can according to the present invention, is a method in which, an ink is to be transferred onto a can main body of a seamless can by a curved surface printing, to form an overlapping portion in which, an ink layer at a front-end portion and an ink layer at a rear-end portion in a circumferential direction of the can body overlap mutually, and in a printing plate which is to be used for the curved surface printing, a volume per unit area of at least one of an ink layer corresponding to the front-end portion and an ink layer corresponding to the rear-end portion is smaller than a volume per unit area of an ink layer corresponding to a portion in continuity with the overlapping portion, excluding the overlapping portion.

In the method for printing on seamless can according to the present invention, it is preferable that the volume per unit area of the ink layer at the front-end portion and the rear-end portion is controlled by changing an ink area ratio of halftone dots.

Effects of the Invention

According to the present invention, since it is possible to reduce a level difference in the ink layer of a portion in continuity with the overlapping portion by reducing a layer thickness of the ink layer in the overlapping portion, it is possible to prevent the occurrence of wrinkling due to the neck-in processing and degradation of the coated-film strength of the overlapping portion, and moreover, it is possible to prevent degradation of the aesthetic appearance.

BRIEF DESCRIPTION OF THE DRAWINGS

FIG. 7 is a table showing printing conditions and evaluation results of example 1, example 2, example 3, example 4, example 5, example for comparison 1, and example for comparison 2.

DESCRIPTION OF REFERENCE NUMERALS

Figure 1:
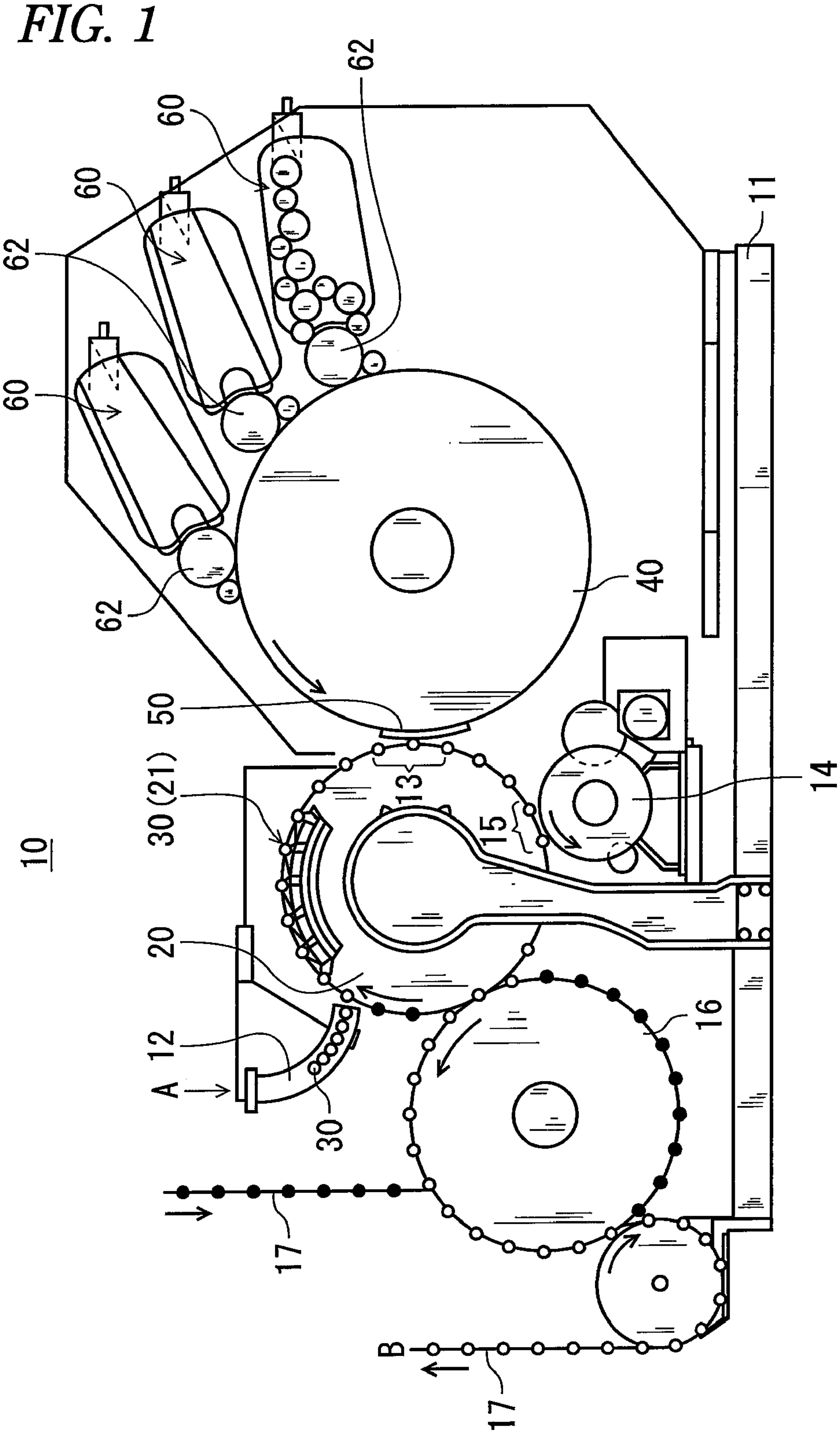
FIG. 1 is a diagram showing a schematic structure of a printing machine according to an embodiment of the present invention.

10 printing machine
13 printing zone
14 varnish applicator
15 over varnishing zone
20 mandrel wheel
21 mandrel

30 can main body
60 inking unit
62 plate cylinders
70 printing plate
71 printing-start portion
71*a* printing plate front end
71*b* boundary line
72 printing-end portion
72*a* printing plate rear end
72*b* boundary line
80 halftone dots
81, 82, 83, 84, 85, 86, 87, 88 halftone dot group
90 halftone dots
91, 92, 93, 94, 95, 96, 97, 98 halftone dot group
100 ink layer
101, 102, 103, 104, 105, 106, 107 ink layer group
110 ink layer group
115 ink layer in continuity with overlapping portion
121, 122, 123, 124, 125, 126 ink layer group
130 ink layer group
135 ink layer in continuity with overlapping portion
140 overlapping portion
160 can body
171 printing-start portion
171*a* front end
180 halftone dots
181, 182, 183, 184, 185, 186, 187 area
A forming-machine side
B oven side

BEST MODE FOR CARRYING OUT THE INVENTION

A seamless can according to an embodiment of the present invention will be described below in detail while referring to the accompanying diagrams.

An ink layer is transferred by a curved surface printing, onto a can body of the seamless can according to the embodiment. A direction of the curved surface printing is substantially same as a circumferential direction of the can body which is in the form of a hollow circular cylinder, and the ink layer which has been transferred includes an overlapping portion which is formed by an ink layer at a front-end portion and an ink layer at a rear-end portion being overlapped mutually.

An ink area ratio for at least one of the ink layer at the front-end portion and the ink layer at the rear-end portion is smaller than an ink area ratio for an ink layer in a portion in continuity with the overlapping portion, excluding the overlapping portion.

To start with, a printing machine for carrying out the curved surface printing on the can body of the seamless can will be described below while referring to FIG. 1. FIG. 1 is a diagram showing a schematic structure of a printing machine 10 according to the embodiment. The printing machine of the present invention is not restricted to the printing machine shown in FIG. 1, provided that the printing machine is capable of carrying out the curved surface printing on the seamless can.

The printing machine 10, as shown in FIG. 1, includes a mandrel wheel 20, a blanket wheel 40, and an inking unit 60, which are disposed on a base 11.

The printing machine 10 is an offset printing machine which transfers an ink which is on a blanket 50 disposed on an outer peripheral surface of the blanket wheel 40, onto an outer peripheral surface of a can body of a can main body 30 of the seamless can in the form of a substantially circular cylinder having a base, which is cantilever-supported by a mandrel 21 provided on the mandrel wheel 20.

Although it is not shown in FIG. 1, generally, a plurality of blankets 50 is installed on the outer peripheral surface of the blanket wheel 40.

Moreover, in the embodiment, the can main body 30 of the seamless can is let to be an object which is subjected to printing. However, the present invention is applicable to any object (such as bottles, tubes, and cups made of resin, and metal tubes) other than can, provided that the object is in the form of a hollow circular cylinder having a base.

A detailed structure of each member will be described below.

The printing machine 10 includes on the base 11, in order from a forming-machine side A which is not shown in the diagram, a transporting portion 12, the mandrel wheel 20, a varnish applicator 14, and a transfer unit 16, as a mechanism which transports the can main body 30.

Moreover, the printing machine 10 has the blanket wheel 40 provided with the blanket 50, and the inking unit 60, as a mechanism which transfers the ink on the can main body 30 which has been transported.

The can main body 30 is formed after being subjected to processes such as drawing, blanking, ironing, stretch drawing, and impact extrusion, in a forming machine, and is supplied to the mandrel wheel 20 by transporting through the transporting portion 12.

A plurality of mandrels 21 having a substantially circular cylindrical shape are formed as protrusions on an outer periphery of the mandrel wheel 20, and the plurality of can main bodies 30 which have been transported, are fitted externally such that, an inner surface of a bottom portion makes a contact with a front-end portion in an axial direction of the mandrel 21.

The mandrel wheel 20 and the blanket wheel 40 rotate in synchronization, and in a printing zone 13 where the mandrel wheel 20 and the blanket wheel 40 are nearest to one another, by moving the blanket 50 while pressing against the can main body 30, the ink on an upper surface of the blanket 50 is transferred onto an outer peripheral surface of the can main body 30.

At this time, the ink on the blanket 50 is transferred onto the can body, in order in the circumferential direction.

After varnish is applied in an over varnishing zone 15 by the varnish applicator 14 to the can main body 30 on which printing is carried out, the can main body 30 is supported one-by-one by a pin chain 17 in the transfer unit 16, and is transported to an oven side B not shown in the diagram.

The can main body 30 supported by the pin chain is dried by heating in an oven.

After the ink and varnish are dried by heating in the oven, the can main body is subjected to a neck-in processing in a neck-in processing section not shown in the diagram, and thereafter, is subjected to a flanging process. The manufacturing of the seamless can is completed by the abovementioned processes.

By the neck-in process, a neck-processed portion having a shape of a single or a plurality of steps, or a smooth shape is formed at an upper portion in a direction of height of the can main body 30.

As a method of neck-in processing, generally, a die-neck processing in which a die is used or a roll-neck processing in which a roll is used, is used.

After the seamless can is filled with a content, a lid which is manufactured separately is double-seamed, and a sterilization process at a high temperature is carried out in a pasteurizer or a retort apparatus, depending on the content.

By the neck-in processing, a metal of the circular cylindrical shaped can body is contracted in a peripheral direction, and a diameter of the can body is reduced.

When there is a substantial ink level difference at an overlapping portion on the can body, the reduction in can diameter cannot be even, and wrinkling is susceptible to occur due to a diameter reducing process.

An outer side of the outer periphery of the blanket wheel 40 is provided with the plurality of inking units 60 and a plurality of plate cylinders 62. An ink of a different color is contained in each of the inking unit 60, and a printing plate corresponding to the color of the ink has been installed.

A waterless offset plate in which, a silicone resin has been used is installed on the plate cylinder 62 of the printing machine 10. The waterless offset plate enables to print a highly defined image on the can main body. For this reason, there has been an increased demand for the waterless offset plate in recent years.

The blanket wheel 40 and the plate cylinder 62 of the inking unit 60 rotate in synchronization, and the ink supplied onto the waterless offset plate from an ink containing portion 61 is transferred onto a predetermined position on a surface printing layer of the blanket 50.

The inking unit 60 can be let to be single according to the content of printing on the can main body 30. Moreover, a photopolymer relief plate or a metal relief plate can be installed on the plate cylinder 62.

Next, a printing plate to be installed on the plate cylinder 62 will be described below by referring to FIG. 2.

Figure 2:
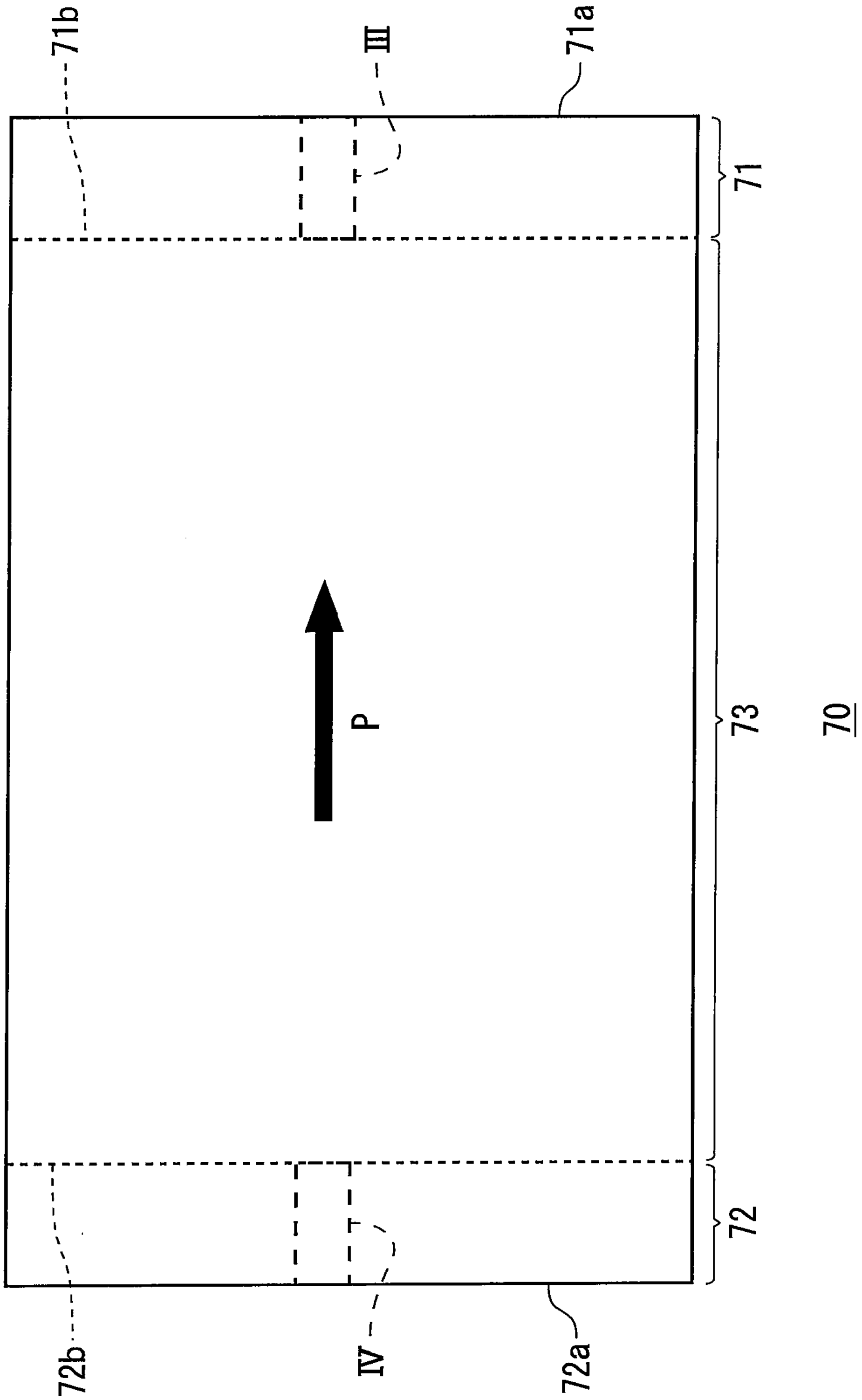
FIG. 2 is a plan view showing an overall structure of a printing plate according to the embodiment.

FIG. 2 is a plan view of an overall structure of a printing plate 70 according to the embodiment.

The printing plate 70 has a rectangular planar shape with a side extended in a printing direction P let to be a long side. As it has been mentioned above, a waterless offset plate, a resin relief plate, and a metal relief plate can be used as the printing plate 70. Plates other than the abovementioned plates can also be used as the printing plate, and the planar shape is also not restricted to the rectangular shape.

The printing plate 70 is installed on the plate cylinder 62 such that a longitudinal direction of the printing plate 70 coincides with a direction of rotation.

Consequently, the longitudinal direction of the printing plate 70 is same as the printing direction (a direction in which the plate moves) P.

The printing plate 70 includes a printing-start portion 71 which is a predetermined range from a front end of a portion onto which, the ink is transferred in the beginning on the can body at the time of printing, a printing-end portion 72 which is a predetermined range from a rear end of the printing direction P, and an intermediate portion 73 which is in continuity with the printing-start portion 71 and the printing end portion 72.

In the printing plate 70, an overall shape, and a range of the printing-start portion 71 and the printing-end portion 72 are designed to form an overlapping portion by an ink layer by the printing-end portion 72 overlapping an ink layer by the printing-start portion 71, when the printing is carried out on the can body of the can main body 30.

Here, an ink layer from a front-end portion up to a rear-end portion in the peripheral direction correspond to ink from the printing-start portion 71 up to the printing-end portion 72 of the printing plate 70, and the overlapping portion is formed by the ink layer at the front-end portion corresponding to the printing-start portion 71 and the ink layer at the rear-end portion corresponding to the printing-end portion 72 overlapping mutually.

Concretely, it is preferable that a range from a printing plate front end 71*a* up to a boundary line 71*b* toward the printing-end portion 72 is more than 0 mm but not more than 3 mm, for the printing-end portion 72 to correspond to the range of the printing-start portion 71, it is preferable that a range from a printing plate rear end 72*a* up to a boundary line 72*b* toward the printing-start portion 71 is more than 0 mm but not more than 3 mm.

By forming the printing-start portion 71 and the printing-end portion 72 in such manner, the ink is transferred such that a front end (a transfer portion of the printing plate front end 71*a*) of the ink layer which has been transferred from the printing-start portion 71 onto the can body corresponds to a front end (a transfer portion of the boundary line 72*b*) of the ink layer which has been transferred from the printing-end portion 72, and a rear end (a transfer portion of the boundary line 71*b*) of the ink layer from the printing-start portion 71 corresponds to a rear end (a transfer portion of the printing plate rear end 72*a*) of the ink layer from the printing-end portion 72, thereby forming the overlapping portion.

Even when the correspondence of the transfer portion of the printing plate front end 71*a* and the boundary line 72*b*, and the correspondence of the transfer portion of the boundary line 71*b* and the printing plate rear end 72*a* are misaligned slightly, it does not pose a problem.

This is because a length of the overlapping portion varies slightly for each can due to a slight difference in dimensions of the blanket and dimensions of the printing plate, and a slight difference in a diameter of each can.

In the printing-start portion 71 and the printing-end portion 72, a plurality of halftone dots of which, an ink area ratio is changed for each toward the printing plate front end 71*a* and the printing plate rear end 72*a*, are provided.

An average ink volume per unit area is an average ink area ratio multiplied by an ink thickness. Therefore, in the printing-start portion 71 and the printing-end portion 72, an ink volume per unit area changes gradually toward the printing plate front end 71*a* and the printing plate rear end 72*a*, according to the ink area ratio of the halftone dots.

When the ink is transferred onto the can body by using the printing plate 70 having such structure, the ink area ratio of the ink layer which has been transferred changes gradually toward the front end and the rear end in the direction of printing according to the ink area ratio of the halftone dots, in the front-end portion and the rear-end portion.

In other words, it is possible to control the ink area ratio of the ink layer which has been transferred onto the can body of the can main body 30 by changing the ink area ratio of the halftone dots of the printing plate 70.

The halftone dots of the printing plate 70 are arranged according to a fixed rule which will be described below.

The ink area ratio of the halftone dots in the printing plate 70 according to the embodiment is changed by changing the area of the plurality of halftone dots.

The arrangement of halftone dots will be described below by referring to FIG. 3 and FIG. 4.

Figure 3:
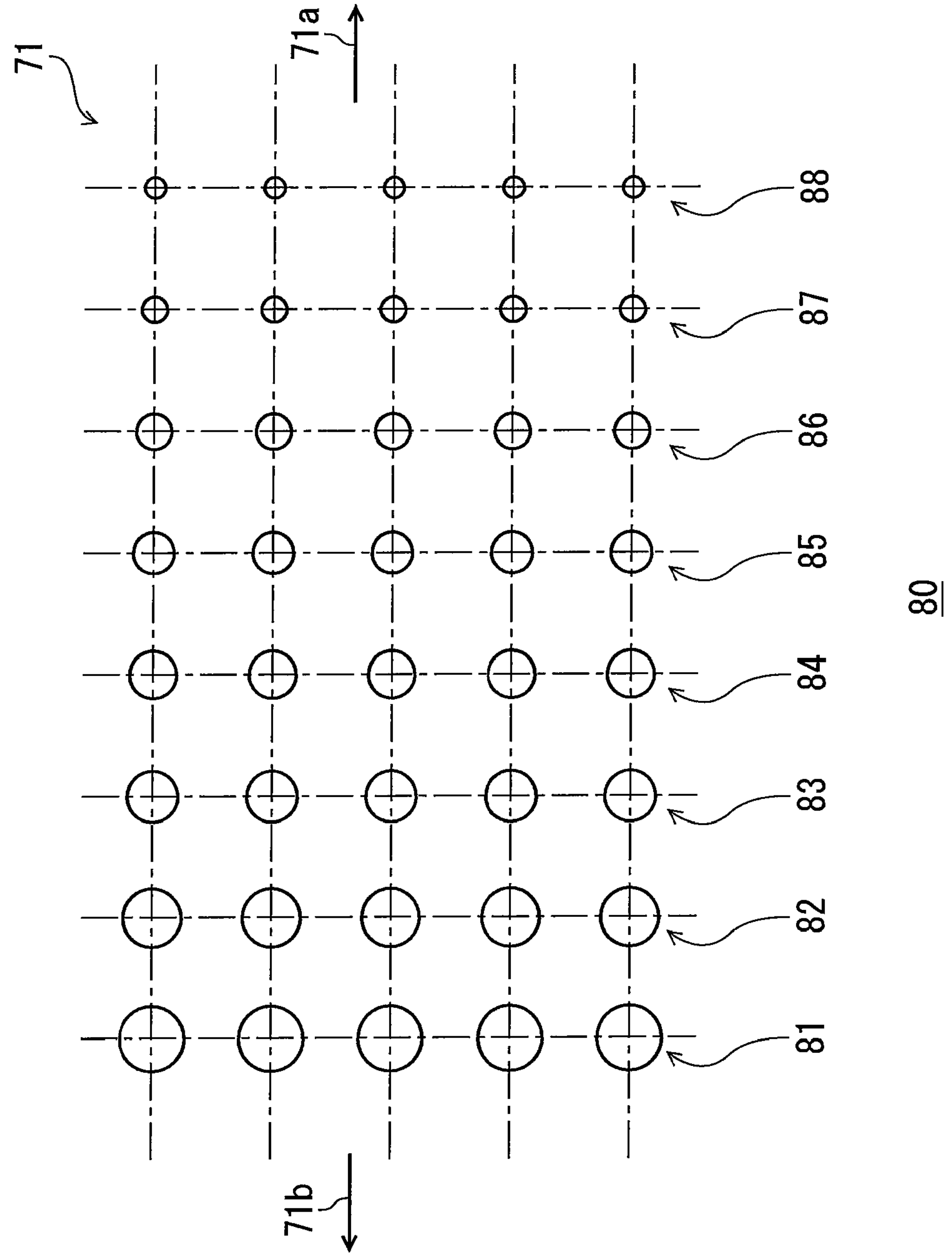
FIG. 3 is an enlarged plan view of a portion III in FIG. 2, showing an arrangement of halftone dots at a printing-start portion of the printing plate according to the embodiment.
Figure 4:
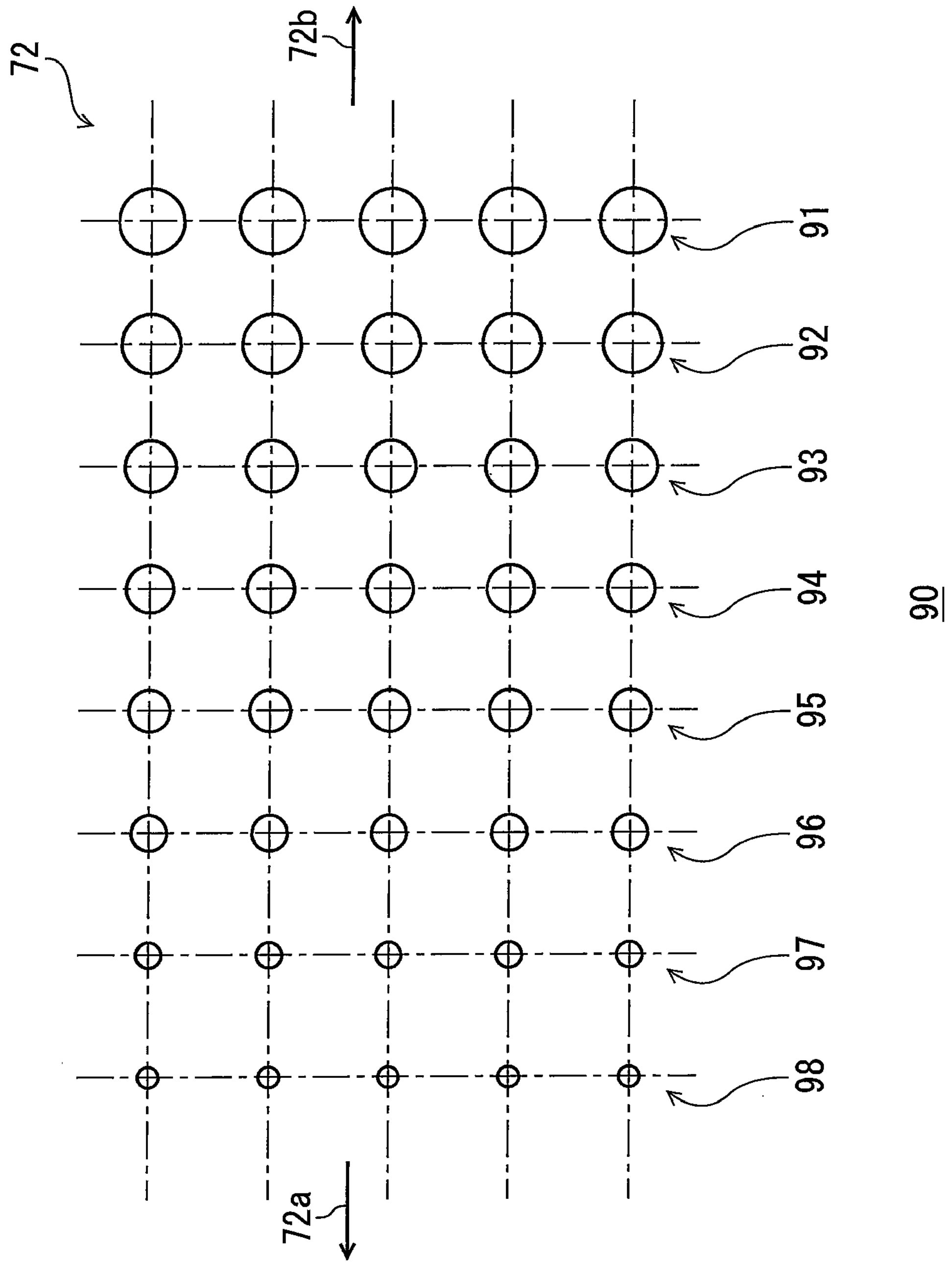
FIG. 4 is an enlarged plan view of a portion IV in FIG. 2, showing an arrangement of halftone dots at a printing-end portion of the printing plate according to the embodiment.

FIG. 3 is an enlarged plan view of a portion III in FIG. 2, showing an arrangement of halftone dots 80 at the printing-start portion 71 of the printing plate 70, and FIG. 4 is an enlarged plan view of a portion IV in FIG. 2, showing an arrangement of halftone dots 90 at the printing-end portion 72 of the printing plate 70.

The arrangement of the halftone dots described below is just an example, and the present invention is not restricted to such arrangement.

As shown in FIG. 3, the printing-start portion 71 includes halftone dot groups 81, 82, 83, 84, 85, 86, 87, and 88 which are arranged at an equal interval, in order from the boundary line 71*b* side (left side in FIG. 3) toward the printing plate front end 71*a* side (right side in FIG. 3).

Each of the halftone dot groups includes a plurality of halftone dots having the same shape, arranged at an equal interval, in a direction orthogonal to the printing direction.

Consequently, in the printing-start portion 71, the plurality of halftone dots are arranged vertically and horizontally on a regular basis.

Chain lines which are extended vertically and horizontally in FIG. 3 are auxiliary lines showing a central position of each halftone dot for the sake of explanation.

Furthermore, an area of each of the halftone dot groups 81, 82, 83, 84, 85, 86, 87, and 88 decreases gradually toward the printing plate front end 71*a*.

Therefore, the volume per unit area of the ink in the printing-start portion 71 also decreases gradually toward the printing plate front end 71*a*.

The ink area ratio on the surface of the can body, of the ink layer which has been transferred from the printing-start portion 71 having such an arrangement decreases gradually toward the front end, corresponding to the decrease in the area of the halftone dot groups 81, 82, 83, 84, 85, 86, 87, and 88.

In offset printing of a seamless can, the ink volume per unit area can be considered as the ink area per unit area.

On the other hand, as shown in FIG. 4, the printing-end portion 72 includes halftone dot groups 91, 92, 93, 94, 95, 96, 97, and 98 which are arranged at an equal interval, in order from the boundary line 72*b* side (right side in FIG. 4) toward the printing plate rear end 72*a* side (left side in FIG. 4).

Each of the halftone dot groups includes a plurality of halftone dots having the same shape, arranged at an equal interval, in a direction orthogonal to the printing direction.

Consequently, in the printing-end portion 72, the plurality of halftone dots are arranged vertically and horizontally on a regular basis, similarly as in the printing-start portion 71.

Even in FIG. 4, chain lines which are extended vertically and horizontally are auxiliary lines showing a central position of each halftone dot for the sake of explanation.

Furthermore, an area of each of the halftone dot groups 91, 92, 93, 94, 95, 96, 97, and 98 decreases gradually toward the printing plate rear end 72*a*.

Therefore, the volume per unit area of the ink in the printing-end portion 72 also decreases gradually toward the printing plate rear end 72*a*.

The ink area ratio on the surface of the can body, of the ink layer which has been transferred from the printing-end portion 72 having such an arrangement decreases gradually toward the rear end corresponding to the decrease in the area of the halftone dot groups 91, 92, 93, 94, 95, 96, 97, and 98.

Furthermore, a rate of decrease in the area of the halftone dot groups 81, 82, 83, 84, 85, 86, 87, and 88 corresponds to a rate of decrease in the area of the halftone dot groups 91, 92, 93, 94, 95, 96, 97, and 98.

In other words, a gradient of change in the rate of decrease in the area of the halftone dot groups 81, 82, 83, 84, 85, 86, 87, and 88 corresponds to a gradient of an increase in the area from the halftone dot group 98 on the printing plate rear end 72*a* side of the printing-end portion 72 to the halftone dot group 91 on the boundary line 72*b* side.

A structure of the ink layer which has been transferred from the printing plate 70 onto the can body will be described below by referring to FIG. 5A and FIG. 5B.

Figure 5A:
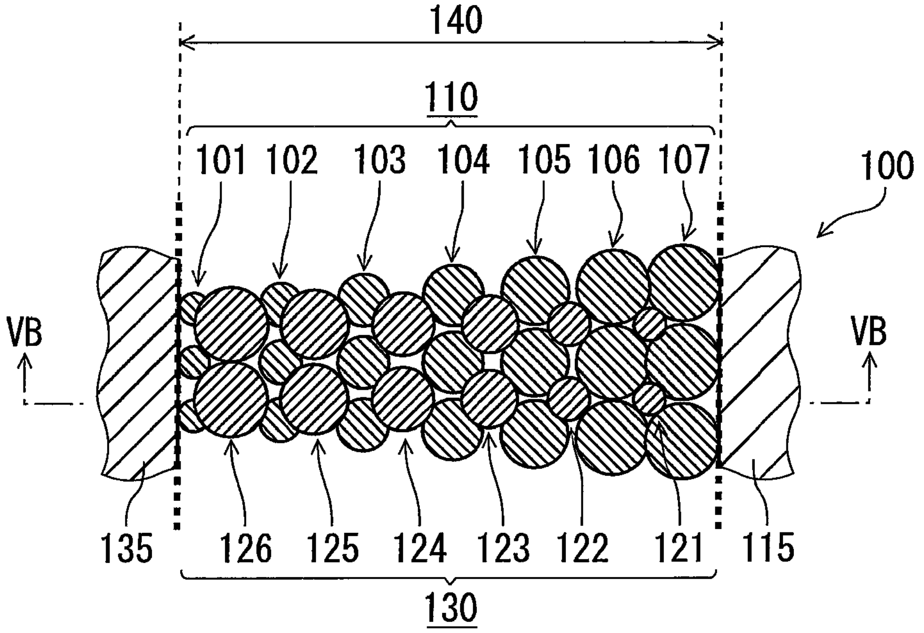
FIG. 5A is a plan view showing an example of a structure in an overlapping portion and a portion in continuity with the overlapping portion, of an ink layer which has been transferred from the printing plate.
Figure 5B:
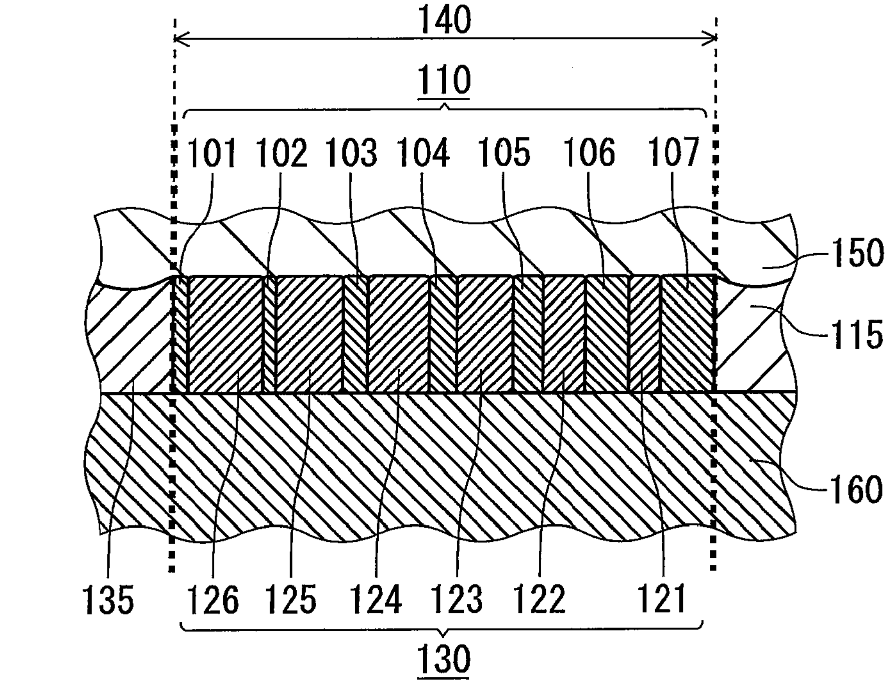
FIG. 5B is a cross-sectional view along a line VB-VB in FIG. 5A, showing a cross-sectional structure of the ink layer in the overlapping portion and the portion in continuity with the overlapping portion.

FIG. 5A is a plan view showing an example of a structure in an overlapping portion 140 and a portion in continuity with the overlapping portion 140, of the ink layer which has been transferred from the printing plate 70, and FIG. 5B is a cross-sectional view along a line VB-VB in FIG. 5A, showing a cross-sectional structure of the ink layer in the overlapping portion 140 and the portion in continuity with the overlapping portion 140.

In FIG. 5A and FIG. 5B, the circumferential direction of the can main body 30, which is the printing direction, is left-right direction. In FIG. 5A, the can body and varnish are not shown.

Moreover, in FIG. 5A and FIG. 5B, for the sake of explanation, an ink layer transferred from the printing-start portion 71 and a portion in continuity with the printing-start portion 71 respectively, of the printing plate 70, and an ink layer transferred from the printing-end portion 72 and a portion in continuity with the printing-end portion 72 respectively, are indicated to be different.

In FIG. 5A and FIG. 5B, the ink layer transferred from the printing-start portion 71, out of an ink layer 100 which has been transferred from the printing plate 70 corresponds to an ink layer group 110 in a front-end portion, and the ink layer transferred from the printing-end portion 72, out of the ink layer 100 which has been transferred from the printing plate 70 corresponds to an ink layer group 130 in a rear-end portion.

Moreover, ink transferred from a portion in continuity with the printing-start portion 71 in the intermediate portion 73 of the printing plate 70 forms an ink layer 115 which is in continuity with the ink layer group 110, and ink transferred from a portion in continuity with the printing-end portion 72 in the intermediate portion 73 forms an ink layer 135 which is in continuity with the ink layer group 130.

Here, the arrangement and area of the halftone dots shown in FIG. 3 and FIG. 4, and the arrangement and area of the ink layers in the overlapping portion show in FIG. 5A and FIG. 5B are exemplifications, and the halftone dots shown in FIG. 3 and FIG. 4, and the ink layers shown in FIG. 5A and FIG. 5B are not same.

The ink layer group 110 at the front-end portion of the ink layer 100 is transferred at the start of the printing by the printing plate 70 onto the overlapping portion 140 on a can body 160, and the ink layer group 130 at the rear-end portion of the ink layer 100 is transferred onto the overlapping portion 140 on the can body 160 at the end of the printing by the printing plate 70.

The ink layer group 110 includes ink layer groups 101, 102, 103, 104, 105, 106, and 107. The ink layer groups are arranged from a printing-start position in the abovementioned order, from the ink layer group having a small area ratio to the ink layer group having a substantial area ratio on the can body 160.

The ink layer group 130 includes ink layer groups 121, 122, 123, 124, 125, and 126. The ink layer groups are arranged from a printing-end position in the abovementioned order, from the ink layer group having a small area ratio to the ink layer group having a substantial area ratio on the can body 160.

The ink layer groups 101, 102, 103, 104, 105, 106, and 107, and the ink layer groups 121, 122, 123, 124, 125, and 126 are distributed in such manner that, is some cases, central positions thereof overlap, and in some cases, the central positions thereof do not overlap.

An ink layer group 126 side having a substantial volume in the ink layer group 130 is disposed on an ink layer group 101 side having a small volume in the ink layer group 110, and an ink layer group 121 side having a small volume in the ink layer group 130 is disposed on an ink layer group 107 side having a substantial volume in the ink layer group 110.

By making such an arrangement, it is possible to make smooth and small a level different between an ink layer thickness of the ink layer 115 and the ink layer 135, and an ink layer thickness of the overlapping portion 140, and it is possible to suppress effectively the wrinkling due to the neck-in processing and a degradation of a coated-film strength of the overlapping portion.

Consequently, as a result of a volume of the ink becoming substantially same in a peripheral direction (left-right direction in FIG. 5A and FIG. 5B) in the overlapping portion 140, it is possible to let an average value of the ink layer thickness to be substantially same over the entire range.

Furthermore, it is possible to let the average value of the ink layer thickness in the peripheral direction of the overlapping portion 140 to be substantially same as at least the ink layer thickness of the portions 115 and 135 in continuity with the overlapping portion 140.

In other words, it is possible to bring the average value of the ink layer thickness in the peripheral direction of the overlapping portion 140 at least within a range of 0.8 times to 1.4 times of the average value of the ink layer thickness of the portions 115 and 135 in continuity with the overlapping portion 140.

The abovementioned description has been made assuming that the ink layers of the portions 115 and 135 in continuity with the overlapping portion 140 have been formed by solid printing. However, it is also possible to form the ink layers of the portions 115 and 135 by halftone printing.

Concretely, an ink area ratio of halftone dots at the front-end portion or the rear-end portion is to be made further smaller than an ink area ratio of halftone dots of the portions 115 and 135 in continuity with the overlapping portion 140.

Accordingly, it is possible to have an effect similar to an effect in a case when the portions 115 and 135 in continuity with the overlapping layer 140 are formed by solid printing.

Moreover, when the halftone dots are formed by multicolor (multi-printing plate), it is possible to have an effect by making small an ink area ratio of halftone dots of at least one or more colors.

As compared to the portions 115 and 135 in continuity with the overlapping portion 140, an ink layer in the ink layer group 110 printed by using halftone dots has a smaller ink area ratio.

This is similar for the ink layer in the ink layer group 130.

In FIG. 3 and FIG. 4, the description has been made for a pattern in which, in each halftone dot group of the printing-start portion 71 and the printing-end portion 72, a plurality of halftone dots having same shape disposed at an equal interval are arranged vertically and horizontally on a regular basis, in a direction orthogonal to the printing direction. However, the pattern may be such that the halftone dots are distributed with a fixed angle with respect to the printing direction.

Next, a modified embodiment of the embodiment will be described below.

In the printing plate 70 according to the abovementioned embodiment, the ink area ratio of halftone dots in the printing-start portion 71 and the printing-end portion 72 has been changed by making the area of the halftone dots arranged at a fixed interval smaller gradually toward the printing plate front end 71*a* and the printing plate rear end 72*a*. However, it is also possible to change the ink area ratio by a method other than the abovementioned method.

Figure 6:
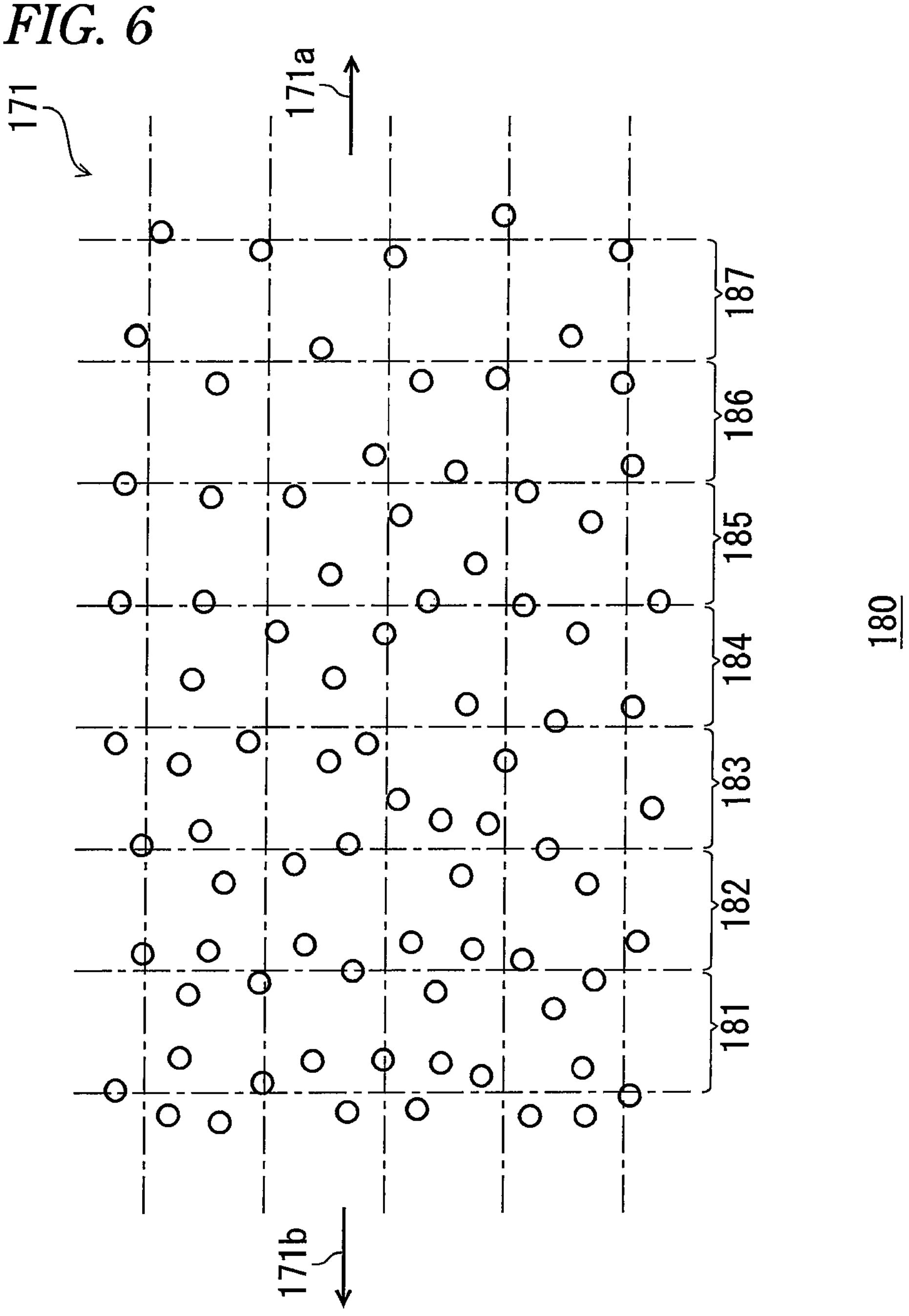
FIG. 6 is a plan view showing an arrangement of halftone dots in the printing-start portion of the printing plate according to a modified embodiment.
Figure 8:
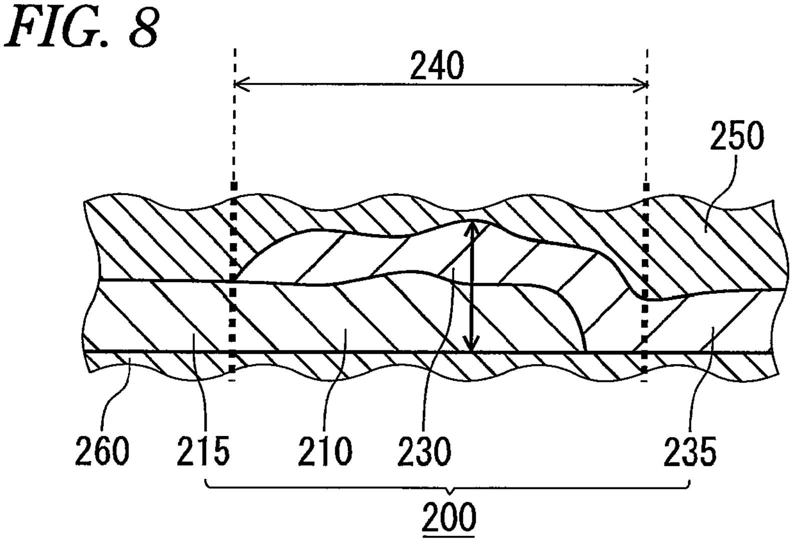
FIG. 8 is a cross-sectional view in a direction of a thickness, showing a structure of an ink layer in the overlapping portion and an area surrounding the overlapping portion, on the conventional can body.

For instance, as shown in FIG. 6, it is also possible to change the ink area ratio by changing a density of arrangement of the halftone dots of same area.

FIG. 6 is a plan view corresponding to FIG. 3, showing a formation of halftone dots 180 in a printing-start portion 171 of a printing plate according to the modified embodiment;

A arrangement of halftone dots in a printing-end portion of a printing plate according to the modified embodiment being equivalent to the arrangement of the halftone dots in the printing-start portion 171 shown in FIG. 6, with left-right reversed, similarly as in FIG. 3 and FIG. 4, a diagrammatic representation and a description in detail thereof are omitted.

As shown in FIG. 6, the printing-start portion 171 includes areas 181, 182, 183, 184, 185, 186, and 187 arranged in order at an equal interval from a rear end 171*b* side (left side in FIG. 6) toward a front end 171*a* side (right side in FIG. 6).

A plurality of halftone dots having same shape is arranged in each of the areas 181, 182, 183, 184, 185, 186, and 187.

The halftone dots arranged in the areas 181, 182, 183, 184, 185, 186, and 187 are arranged such that the number of halftone dots decreases gradually toward the front end 171*a*, or in other words, the density of arrangement of the halftone dots decreases gradually toward the front end 171*a*.

For an ink layer which has been transferred onto a can body by using a printing plate having such an arrangement, an ink area ratio of a surface of the can body decreases gradually toward a front end, at a front end portion corresponding to the printing-start portion 171, corresponding to the decrease in the halftone dots in the areas 181, 182, 183, 184, 185, 186, and 187.

Moreover, in the printing plate 70 according to the abovementioned embodiment, the ink area ratio of the halftone dots in both the printing-start portion 71 and the printing-end portion 72 has been changed. However, the ink area ratio of the halftone dots in one of the printing-start portion 71 and the printing-end portion 72 may be let to be constant in the printing direction, or it may be solid printing.

In solid printing, the ink area ratio is 100%.

As a means for changing the ink area ratio of the overlapping portion 140, or the ink volume per unit area in the printing-start portion 71 and the printing-end portion 72 of the printing plate 70, or in other words, a means for controlling the ink volume per unit area or the ink area ratio, it is not restricted to the change in the area of the halftone dots as mentioned above.

Although, any of the means for creating gaps of ink portion such as reducing area of an overlapping portion as a part of a design, formation of lines and dots (halftone dots) in a relief ink-receptive area may be used, it is preferable to use halftone dots for aesthetic purpose and reproducibility of a screen.

The halftone dots can have various shapes such as a circular shape, a polygonal shape, an elliptical shape, a rectangular shape, an asymmetric shape, and a graphic shape, and it may be a mixture of small and large shapes.

The line form may have a thin-line shape, a lattice shape, a curved-line shape, and a mixture of thick and thin lines.

EXAMPLES

Next, examples of the present invention will be described below while referring to FIG. 7.

FIG. 7 is a table showing printing conditions and evaluation result of example 1, example 2, example 3, example 4, example 5, example for comparison 1, and example for comparison 2.

(Manufacturing of Seamless Can)

A glamour wax was applied uniformly on a resin-coated metal plate, on which, a non-oriented polyethylene terephthalate/isophthalate copolymer film of a thickness 16 μm has been laminated by thermal lamination on a side which becomes an inner surface of a can, and a non-oriented polyethylene terephthalate/isophthalate copolymer film of a thickness 16 μm has been laminated by thermal lamination on a side which becomes an outer surface of the can of an aluminum alloy plate (JIS 3004 alloy) of 0.28 mm plate thickness which has been subjected to chromium phosphate based surface treatment. After applying the glamour wax, a circular plate of diameter 142 mm was blanked, and upon drawing and ironing, an edge of an opening was trimmed. Thereafter, by carrying out a heat treatment for eliminating deformation of the film for one minute at 215° C., a drawn and ironed cup of diameter 66 mm and height 124 mm was obtained.

The drawn and ironed cup obtained was subjected to curved surface printing by using a resin relief printing plate or a waterless offset plate, using an offset printing machine shown in FIG. 1.

A 3 μm coating of a finishing varnish was applied to the drawn and ironed cup subjected to curved surface printing, and the cup was baked in an oven at 200° C. for one minute. After baking, a die-neck processing of seven steps was carried out, and a diameter of an opening portion of the drawn and ironed cup was reduced from 66 mm to 57 mm, making the opening portion smooth.

Thereafter, flanging was carried out by a routine procedure, and a seamless can for 350 ml was manufactured. The die-neck processing was carried out at a speed of 1500 cans per minute.

(Printing Conditions)

Printing conditions are as shown in a column of 'printing plate' in FIG. 7.

The printing plate was let to be a resin relief plate or a waterless offset plate, and printing for area near the overlapping portion was let to be solid printing, and printing for the overlapping portion was let to be solid printing or halftone dot printing as shown in FIG. 7. A width of the overlapping portion was let to be 1.5 mm.

From among these conditions, 'halftone dot gradation' means a state in which, central positions of a plurality of halftone dots are arranged according to a definite rule, and an area of halftone dots decreases gradually toward the front end or the rear end, as shown in FIG. 3 and FIG. 4.

Whereas, 'solid' is a case of printing by applying ink on overall portion without providing halftone dots.

Ink specifications for resin relief plate are as follows.

(i) Viscosity: 25 Pa·s
(ii) Flow value: 37.0 mm
(iii) Tack value: 8.5
(iv) Color: cyan Whereas, ink specifications for waterless offset plate are as follows.

(i) Viscosity: 50 Pa·s
(ii) Flow value: 30.0 mm
(iii) Tack value: 8.5
(iv) Color: cyan For halftone dots in the overlapping portion, in a case of the resin relief plate, gradation printing was carried out with screen ruling of 120 lines per inch, round dots, screen angle of 45 degrees, and ink area ratio on solid printing side 100% to ink area ratio on front-end side 0%.

In a case of waterless offset plate, gradation printing was carried out with screen ruling of 250 line per inch, round dots, screen angle of 45 degrees, and ink area ratio on solid printing side 100% to ink area ratio on front-end side 0%. The width of the overlapping portion was set to be 1.5 mm.

In the examples and the examples for comparison, the printing plate was manufactured as shown in FIG. 7.

An average ink area ratio of an ink portion in the overall overlapping portion for a printing-start portion as well as a printing-end portion of an overlapping portion of the printing plate which has been manufactured as described above was 50%. Whereas, a portion in continuity with the overlapping portion, excluding the overlapping portion was subjected to solid printing and the average ink area ratio of the ink portion was 100%.

Next, a measuring method will be described below.

(Ink Level Difference)

For three cans which were manufactured, an overlapping portion at a center of a can height was cut out. The cut-out portion was embedded in an epoxy resin, and grinding was carried out such that a cross-section in the circumferential direction of the can body can be observed.

The overlapping portion cross-section which has been obtained was observed by an optical microscope, and the thickness of the ink layer was measured.

An average value of ink thickness near the overlapping portion and an average value of ink thickness in the overlapping portion were calculated, and the difference between the two average values was let to be the ink level difference in the overlapping portion.

The ink thickness of the overlapping portion is substantially uneven. However, an average value of ink thickness of the entire overlapping width was let to be a measured value and an average value for three cans was let to be an ink level difference value for the examples and the examples for comparison, and was shown in FIG. 7.

In any of the examples from example 1 to example 5, and example for comparison 1 and example for comparison 2, an average value of an ink-layer film thickness of a solid printing portion of a portion in continuity with the overlapping portion was 4.0 μm.

(Viscosity of Ink)

A viscosity of ink used in the examples and the examples for comparison was measured by cone-plate viscometer (Carri-Med Rheometer CSL 2 500, manufactured by TA Instrument Co). A cone use for the measurement was a steel cone having a diameter of 1 cm and an angle of a conical surface of 1 degree, and measuring conditions are as follow.

(1) Measured temperature: 30° C.
(2) Shear velocity; ink for resin plate 0→100 s-1, 1 minute Ink for waterless offset plate 0→100s-1, 2 minutes (Ink Flow Value)

An SD (60) value which is the ink flow value, is a value measured after 60 seconds, by a spread meter at a room temperature of 25° C., according to JIS K 5701-1.

(Ink Tack Value)

A TV (400) value which is the ink tack value was measured by an inkometer, according to JIS K 5701-1.

The ink tack value was measured with conditions of rpm of a metal roller 400 rpm (revolutions per minute), and temperature of 30° C.

Next, an evaluation method will be described below in order.

(Evaluation of Coating-Film Strength)

A coating-film strength of the overlapping portion of the seamless can manufactured was evaluated by a pencil hardness test.

For two seamless cans manufactured, after a still retort treatment was carried out at 130° C. for thirty minutes, pencil hardness was measured for an overlapping portion on an outer surface at a center of the height of the can, and the lowest value of strength from values for the two cans was let to be a measured value.

For the measurement of pencil hardness, according to a pencil scratch hardness test of JIS K 5400, 2B, B, HB, F, H, 2H, and 3H pencils were used to rub once at an angle of 45 degrees, and the maximum pencil hardness that cannot scrape resin was let to be a measured value for that can.

The evaluation was carried out based on the following criteria, and ○ and Δ were let to be an acceptable range.

○: H, 2H

Δ: F x: HB, B, 2B (Evaluation of Rate of Occurrence of Neck Wrinkling)

For 7000 seamless cans that were manufactured, neck wrinkling of the overlapping portion was checked visually, and a rate of occurrence of neck wrinkling was calculated. The evaluation was carried out based on the following criteria. ○ and Δ were let to be an acceptable range.

○: less than 5%

Δ: 5% or more~less than 30% x: 30% or more (Overall Evaluation)

The worst evaluation out of coated-film strength evaluation and the neck-wrinkling occurrence evaluation was let to be the overall evaluation for the examples and the examples for comparison. ○ and Δ were let to be acceptable range.

Example 1

Seamless cans were manufactured by using a resin relief plate as a printing plate and an ink for the resin relief plate, and by letting the printing-start portion to be the halftone dot gradation, and the printing-end portion to be the halftone dot gradation. The result of the evaluation was, coated-film strength ○(H) and neck-wrinkling ○ (rate of occurrence of neck wrinkling 0%), and the overall evaluation was ○.

Example 2

Seamless cans were manufactured similarly as in example 1, except for letting the printing-start portion of the printing plate to be subjected to solid printing.

The result of the evaluation was, coated-film strength Δ(F) and neck wrinkling Δ (rate of occurrence of neck wrinkling 10%), and the overall evaluation was Δ.

Example 3

Seamless cans were manufactured similarly as in example 1, except for letting the printing-end portion of the printing plate to be subjected to solid printing.

The result of the evaluation was, coated-film strength Δ(F) and neck wrinkling Δ (rate of occurrence of neck wrinkling 14%), and the overall evaluation was Δ.

Example 4

Seamless cans were manufactured similarly as in example 1, except for letting the printing plate to be the waterless offset plate, and using the ink for the waterless offset plate.

The result of the evaluation was, coated-film strength ○(H) and neck wrinkling ○ (rate of occurrence of neck wrinkling 4%), and the overall evaluation was ○.

Example 5

Seamless cans were manufactured similarly as in example 4, except for letting the printing-start portion of the printing plate to be subjected to solid printing.

The result of the evaluation was, coated-film strength Δ(F) and neck wrinkling Δ (rate of occurrence of neck wrinkling 28%), and the overall evaluation was Δ.

Example for Comparison 1

Seamless cans were manufactured similarly as in example 1, except for letting both the printing-start portion and the printing-end portion of the printing plate to be subjected to solid printing.

The result of the evaluation was, coated-film strength×(B) and neck wrinkling×(rate of occurrence of neck wrinkling 90%), and the overall evaluation was ×.

Example for Comparison 2

Seamless cans were manufactured similarly as in example 4, except for letting both the printing-start portion and the printing-end portion of the printing plate to be subjected to solid printing.

The result of the evaluation was, coated-film strength×(B) and neck wrinkling×(rate of occurrence of neck wrinkling 100%), and the overall evaluation was ×.

The following points are revealed from FIG. 7.

(1) As compared to the examples for comparison 1 and 2, in the examples from example 1 to example 5, the level difference which is a cause of wrinkling of the neck portion could be suppressed to be small.

Accordingly, in examples from example 1 to example 5, favorable coated-film strength could be realized, and the occurrence of neck wrinkling could be suppressed.

(2) As it is revealed upon comparing the rate of occurrence of neck wrinkling in example 2 and example 3, in a case in which, the ink area ratio (ink volume per unit area of the printing plate 70) of one of the printing-start portion 71 and the printing-end portion 72 made smaller, and the other is subjected to solid printing, making the ink area ratio and the ink volume per unit area of the printing-end portion 72 small, and making the ink area ratio at the rear-end portion in the circumferential direction of the can body small is more effective than making the ink area ratio and the ink volume per unit are of the printing-start portion 71 small, and making the ink area ratio of the front-end portion in the circumferential direction of the can body small.

As the formation has been as described above, according to the embodiment, the following effects are shown.

(1) Since the ink area ratio for at least one of the ink layer at the front-end portion and the ink layer at the rear-end portion is smaller than the ink area ratio at least for the ink layer in a portion in continuity with the overlapping portion, it is possible to suppress the ink-layer thickness of the overlapping portion, and to make small the level difference with the portion in continuity with the overlapping portion. Accordingly, it becomes possible to suppress the occurrence of wrinkles in the neck-in processing, and it is possible to provide a highly decorative seamless can.

(2) By providing halftone dots for which the ink area ratio is changed in the printing direction, at least in one of the printing-start portion and the printing-end portion of the printing plate, it is possible to reduce an amount of ink to be used as compared to a conventional printing plate which had been subjected to solid printing.

The present invention has been described while referring the embodiment described above. However, the present invention is not restricted to the embodiment described above, and various modifications and alternative constructions which fairly fall within the basic teaching herein set forth are possible.

INDUSTRIAL APPLICABILITY

As it has been described above, the seamless can according to the present invention does not lose decorativeness, and an aesthetic appearance of the overlapping portion is improved. Moreover, the can is less susceptible to scratches during preservation and distribution, and furthermore, it is possible to realize a low cost by reducing an amount of ink used.

The invention claimed is:

1. A seamless can in which an ink layer of a plurality of different colors is transferred onto a can body of the seamless can by a curved surface printing, the curved surface printing being one of relief printing and waterless offset printing, and wherein:

the ink layer which has been transferred onto the can body includes an overlapping portion, the overlapping portion being formed by mutual overlapping of a front-end portion of the ink layer and a rear-end portion of the ink layer in a circumferential direction of the can body;

an ink area ratio for at least one of the front-end portion and the rear-end portion is smaller than an ink area ratio for an intermediate portion of the ink layer, wherein the intermediate portion is adjacent to and continuous with the overlapping portion in the circumferential direction and excludes the overlapping portion;

the ink area ratio for both of the front-end portion and the rear-end portion is controlled by changing an ink area ratio of halftone dots;

the seamless can is dried by heating after varnish is applied on the ink layer;

a length of the overlapping portion in the circumferential direction is more than 0 mm and not greater than 3 mm; and the can body is subjected to a neck-in processing by a die-neck processing.

2. The seamless can according to claim 1, wherein the ink area ratio for both of the front-end portion and the rear-end portion is smaller than the ink area ratio for the ink layer in the intermediate portion.

3. The seamless can according to claim 1, wherein:

the ink area ratio of the front-end portion decreases gradually toward a front end of the ink layer in the circumferential direction, and the ink area ratio of the rear-end portion increases gradually away from a rear end of the ink layer in the circumferential direction.

4. The seamless can according to claim 1, wherein the ink area ratio of the front-end portion decreases gradually toward a front end of the ink layer in the circumferential direction to correspond to an increased gradient at which the ink area ratio of the rear-end portion increases gradually as away from a rear end of the ink layer in the circumferential direction.

5. The seamless can according to claim 1, wherein an average value of a layer thickness of the overlapping portion in the circumferential direction is a substantially same average value as a layer thickness of the ink layer in the intermediate portion.

6. The seamless can according to claim 1, wherein the ink area ratio of the halftone dots is controlled by changing an area of a plurality of the halftone dots, and wherein central positions of the halftone dots are regularly arranged.

7. The seamless can according to claim 6, wherein an area of the plurality of halftone dots at the front-end portion decreases gradually toward a front end of the ink layer, and an area of the plurality of halftone dots at the rear-end portion decreases gradually toward a rear end of the ink layer.

8. The seamless can according to claim 1, wherein the ink area ratio of the halftone dots is controlled by changing a density of arrangement of the plurality of halftone dots which are irregularly arranged.

9. The seamless can according to claim 8, wherein the density of arrangement of the plurality of halftone dots at the front-end portion decreases gradually toward a front end of the ink layer, and the density of arrangement of the plurality of halftone dots at the rear-end portion decreases gradually toward a rear end of the ink layer.

* * * * *